June 29, 1965  R. G. WATSON  3,192,535
METHOD AND APPARATUS FOR HIGH SPEED WEIGHING
Filed Sept. 28, 1962  3 Sheets-Sheet 1

INVENTOR.
ROBERT G. WATSON
BY H. H. Woodlief
ATTORNEY

INVENTOR.
ROBERT G. WATSON
BY
ATTORNEY

United States Patent Office 3,192,535
Patented June 29, 1965

3,192,535
METHOD AND APPARATUS FOR HIGH
SPEED WEIGHING
Robert G. Watson, South Euclid, Ohio, assignor to
Republic Steel Corporation, Cleveland, Ohio, a
corporation of New Jersey
Filed Sept. 28, 1962, Ser. No. 226,916
11 Claims. (Cl. 177—1)

This invention relates to apparatus and methods for weighing. It is particularly useful in weighing moving objects although it may also be used in weighing stationary object. It is disclosed herein as applied to the weighing of moving railroad cars. While some features of the invention are of particular utility in connection with the weighing of railroad cars, other features are of more general utility in the weighing of moving objects in general.

Weighing apparatus has previously been devised in which objects are weighed by placing them on a weighing platform supported by one or more load cells. The weighing platform is yieldably supported by the load cells, and the cells produce an electrical output potential proportional to the deflection of the load cells by the platform and the object being weighed. The load cell response to such a deflection is practically instantaneous. However, the load, the platform and the yieldable support constitute an oscillatory system, so that the deflection measured by the load cell, and hence the load cell output potential, goes through several cycles of oscillation after the application of a load to the platform. Commonly, these oscillations are suppressed by an electrical damping network in the circuits connected to the load cell output.

Similar oscillations may be observed when a load is placed on a mechanical scale or balance. There, the oscillations are mechanically damped by dashpots or the like.

The oscillations described above are observed with stationary loads i.e., loads which do not move after being placed on the weighing platform.

When an attempt is made to weigh a moving load, the movement of the load introduces additional oscillations throughout the travel of the load across the weighing platform. These oscillations are due to the transfer of kinetic energy associated with the motion of the load into potential energy associated with the bouncing position of the load and the deflections occurring within the scale platform system.

In the prior art electrical weighing apparatus utilizing load cells, the output indication is commonly obtained by a motor driven indicator. The motor which drives the indicator is also coupled to drive a rebalancing slidewire in a potentiometer balancing network to oppose or null the voltage developed by the load cells. In view of the fact that the motor requires a substantial time to drive the rebalancing slidewire to its null position, that apparatus does not take full advantage of the instantaneous response characteristics of the load cell and weighing time is excessively long.

In the manufacture of steel, the materials delivered to a furnace are commonly supplied in railroad cars. In order that the metallurgy of a particular heat of steel may be accurately controlled, it is necessary that the weight of material in each of the cars be known. If each car must be stopped on a weighing platform to give the scale instrument time to weigh the car and eliminate bounce error, it means that the whole train of cars has to be stopped for the weighing of each car. This results in the tying up of a substantial amount of equipment simply for the purpose of determining the weight of the material being suplied to the furnace.

It is an object of the present invention to provide improved apparatus and methods for weighing moving objects while they are in motion, and without stopping them on a weighing platform.

Another object of the invention is to provide improved apparatus and methods for weighing, utilizing a load cell or system of load cells as a sensitive element.

Another object of the invention is to provide improved methods and apparatus for indicating or recording the output of a load cell.

A further object of the invention is to provide an improved method and apparatus for integrating the output of a load cell over a plurality of oscillation cycles.

Another object of the invention is to provide improved methods and apparatus for weighing loaded railroad cars without uncoupling the car being weighed from the preceding and following cars.

A further object of the invention is to provide improved apparatus and methods of weighing by integrating the oscillations of the loaded platform over a plurality of cycles, without damping the oscillations.

The foregoing and other objects of the invention are attained in the appartus described herein. In that apparatus, a load cell or cells, supporting a conventional weighing platform, is electrically connected to the input of a voltage-to-frequency converter, which produces an output signal having a frequency depending upon the voltage developed by the load cell or cells. The output of the converter is directed to an electronic counter, which integrates the measurement produced by the load cell over an accurately controlled time interval. The counter in turn controls a printer for printing the integrated or average weight figure existing in the counter at the end of the integration interval.

Two switches, spaced a wheel base length apart adjacent the rails, are effective when closed simultaneously by the front and rear wheels of a railroad car to complete a circuit to trigger the beginning of an integration interval. Thus the integration of the load cell output is initiated only after the railroad car is completely scale borne. Once started, the integration interval continues for a fixed period of time. The distance the car travels during this period is dependent on its speed. Obviously, for a given platform length and a given integration interval, a maximum limit on train speed exists.

When a load to be weighed moves across a weighing platform, the instantaneous weight registered on the scale fluctuates at a frequency determined by the total mass of car and load and by the resiliency of the car spring supports and scale platform.

In accordance with the present invention, the output of a load cell attached to the platform is integrated over several cycles of oscillation, and the integrated measurement is used as a measure of the weight of the load. By sufficiently extending the time over which the integration takes place and by making the time of integration long enough to include several periods of oscillation, the errors due to timing of the period of integration with respect to the phase of oscillation may be reduced to zero as a limit.

Where the object being weighed is a loaded railroad car, car coupling errors due to cars attached to the car being weighed are not compensated for in the system. Generally, the couplings allow a limited range of relative vertical movement of the coupled cars. Attention may be given to the installation of straight, level, and rigid approach and exit tracks, and designing the scale platform to be as rigid as possible. Coupling errors tend to average out over a train of cars if these precautions are observed.

Other objects and advantages of the invention will become apparent from a consideration of the following specification and claims, taken together wtih the accompanying drawings.

FIG. 1

Figure 1:
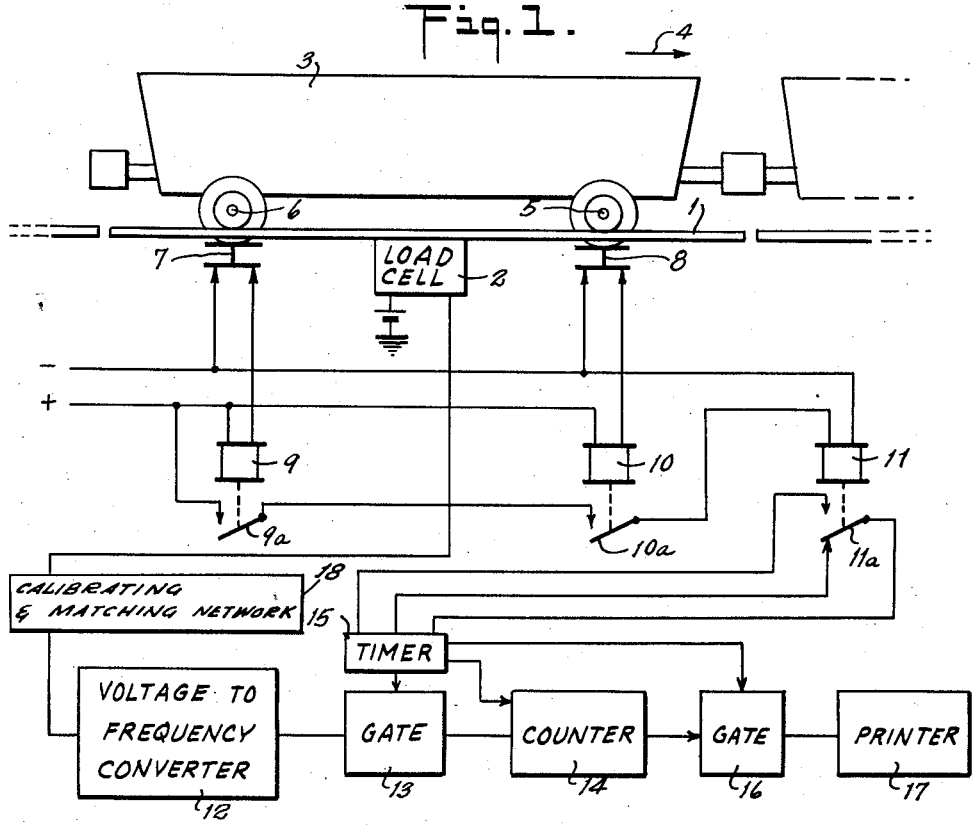
FIG. 1 is a digrammatic illustration of a weighing apparatus embodying the invention.
Figure 2:
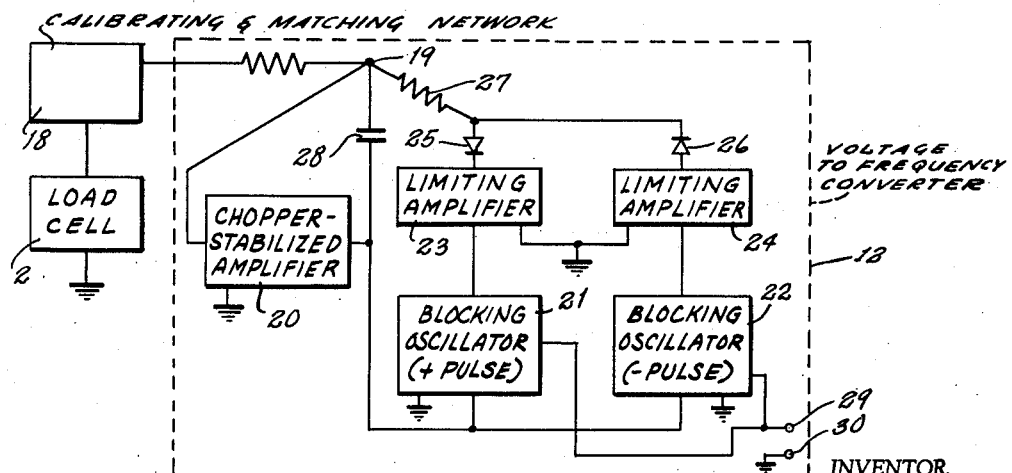
FIG. 2 is a diagrammatic illustration of part of the weighing apparatus of FIG. 1, including additional details of the voltage-to-frequency converter.

This figure illustrates diagrammatically a weighing apparatus constructed in accordance with the invention. The weighing apparatus includes a weighing platform 1, which is mounted on a load cell or system of load cells 2. A suitable weighing platform and load cell arrangement is illustrated in my prior Patent No. 2,998,090. A railway car 3, which may be a charging buggy of a steel furnace, is shown passing over the platform 1 in the direction of the arrow 4. The buggy 3 has a leading axle 5 and a trailing axle 6. A pair of track switches 7 and 8 are mounted adjacent the rail on the platform 1 so as to be engaged by the flanges on the wheels of the charging buggy as it passes over the platform. The switches 7 and 8 are analogous to push button switches. The switch 7 is shown as having its contacts closed by engagement with a flange on a wheel on the trailing axle 6. Switch 8 is likewise closed by engagement with the flange on a wheel on the leading axle 5 since the switches are spaced a wheel base length apart adjacent the rails. Switches 7 and 8 respectively control relays 9 and 10 having front contacts 9a and 10a, respectively connected in series with the winding of a gate opening relay 11 having a contact 11a. The simultaneous closure of both switches indicates the presence of car 3 completely on the weighing platform 1, and starts the integration interval in a manner more completely described below in connection with FIGS. 3 and 4.

Load cells 2 are connected to a calibrating and matching network 18 and thence to a voltage-to-frequency converter 12 having its output connected through a gate 13 to a counter 14.

Relay 11 has a contact 11a which is connected to a timer 15, and acts as a reset contact for that timer.

The voltage-to-frequency converter 12 produces an output signal having a frequency proportional to the input signal, which is in this case a unidirectional potential. Counter 14 integrates the weight measurements produced by the load cell 2 and the converter 12. Gate 13 is opened by timer 15 so that counter 14 begins its integration interval upon the simultaneous closure of switches 7 and 8. Because counter 14 only integrates the weight measurements upon the simultaneous closure of switches 7 and 8, errors caused by a buggy entering and exiting platform 1 are minimized. The duration of the integration interval is taken into account as a calibrating factor in the operation of the counter 14. The output of the counter 14 is supplied through a gate 16 to a printer 17 which produces a printed record showing the weight of the car passing over the platform 1.

FIG. 2

This figure illustrates in somewhat greater detail, although still somewhat diagrammatically, the voltage-to-frequency converter 12. Suitable converters are known in the art. One particular converter suitable for use in connection with the present invention is illustrated in the patent to G. S. Bahrs et al., No. 3,022,469, issued February 20, 1962.

The output voltage from the load cell 2 passes through the calibrating and matching network 18 to a junction 19 in a bridge circuit, commonly referred to as the null point. The potential appearing between the null point 19 and ground is supplied to the input of a chopper-stabilized amplifier 20. The output of the amplifier 20 is supplied to two blocking oscillators 21 and 22, respectively responsive to positive and negative pulses. The outputs of the oscillators 21 and 22 are respectively connected to the inputs of limiting amplifiers 23 and 24, whose outputs are in turn connected respectively through blocking diodes 25 and 26, to a resistor 27 and thence to the null point 19. An integrating capacitor 28 is connected between the null point 19 and the output of the amplifier 20. The blocking oscillators 21 and 22 also have output terminals connected together to a pulse output terminal 29 which cooperates with a grounded output terminal 30. The signals appearing between the output terminals 29 and 30 are supplied through the gate 13 to the counter 14.

When there is no signal at the output of the load cell 2, then there is no signal at the input of amplifier 20 and no tripping pulses are supplied to the blocking oscillators 21 and 22.

When a direct potential appears at null point 19, it is transmitted to the input of amplifier 20 and appears greatly amplified across the capacitor 28. The amplifier 20 is a very high gain amplifier. Typically, the amplifier used has an open-loop gain of 100,000,000 for D.C. and drops off smoothly at 6 db per octave from 0.01 c.p.s. to 1 mc. Depending upon the potential of the output signal of amplifier 20 with respect to ground, it triggers one or the other of the blocking oscillators 21 and 22, which transmits pulses through one of the limiting amplifiers 23 and 24 and one of the diodes 25 and 26 and resistor 27 to capacitor 28. The shape and charge content of each such pulse is accurately controlled by the amplifiers 23 and 24. This operation continues until the pulses delivered through the amplifiers 23 and 24 become effective to build up on the capacitor 28 a charge effective to oppose and cancel the original potential at null point 19 which triggered the operation of the blocking oscillators. Since the charge on the capacitor 28 is continuously being drained through the input of the amplifier, the effect of the converter is to produce at its output terminals 29 and 30 a train of pulses whose frequency is determined by the magnitude of the potential at null point 19.

FIG. 3

The timer 15 includes a fixed frequency oscillator 31, which supplies timed clock pulses to the inputs of a start gate 32 and a stop gate 33. A trigger 34 having complementary outputs controls the start gate 32 and the stop gate 33, so that only one of those gates is open at one time. Signals passing through the start gate 32 pass to the start input of a gate binary circuit 35 and also pass to an interval counter 36. Signals passing through the stop gate 33 are directed to a stop input of the gate binary 35 and also to a reset gate 37. One of the outputs of the trigger 34 is connected to a reset circuit 35a controlled by the relay contact 11a, and shown in detail in FIG. 4. The output of the reset circuit 35a is directed to the control input of the reset gate 37. The output of reset gate 37 controls the starting of the counter 14 and of the interval counter 36. The counter 36 is provided with a comparator circuit 38, which compares the reading in the counter with the setting of a register 39. The output of the comparator circuit 38 controls the condition of the trigger 34.

One output of the gate binary circuit 35 controls the signal gate 13. The complementary output of the gate 35 controls the gate 16 between the counter 14 and the printer 17.

FIG. 4

This figure illustrates the wiring diagram of the reset circuit 35a. It includes a thyratron 40 having an anode 40a, control electrodes 40b and 40c, and a cathode 40d. A wire 41 from the output of trigger 34 leads through a capacitor 42a to the control electrode 40c. Control electrode 40c is connected to cathode 40d through a resistor 42 and is also connected through a resistor 43 to ground. Control electrode 40b is connected directly to the cathode 40d, which is grounded.

Anode 40a is connected to a junction 44 and thence through a variable resistor 45 and a fixed resistor 46 to a B+ supply. The common terminal of resistors 45 and 46 is connected to a back contact 11b associated with the movable contact 11a of relay 11. Movable contact 11a is connected through a capacitor 47 and a resistor 48 to ground. The front contact 11c associated with movable contact 11a is connected through a resistor 49 to ground, and is also connected through a capacitor 50 to a junction 51 between two resistors 52 and 53 connected in series between the B+ supply and ground. Two capacitors 54 and 55 are connected in series between the junction 51 and ground. A resistor 56 is connected between junction 44 and junction 51. Junction 44 is connected to an output line 57 leading to the reset gate 37.

Figure 3:
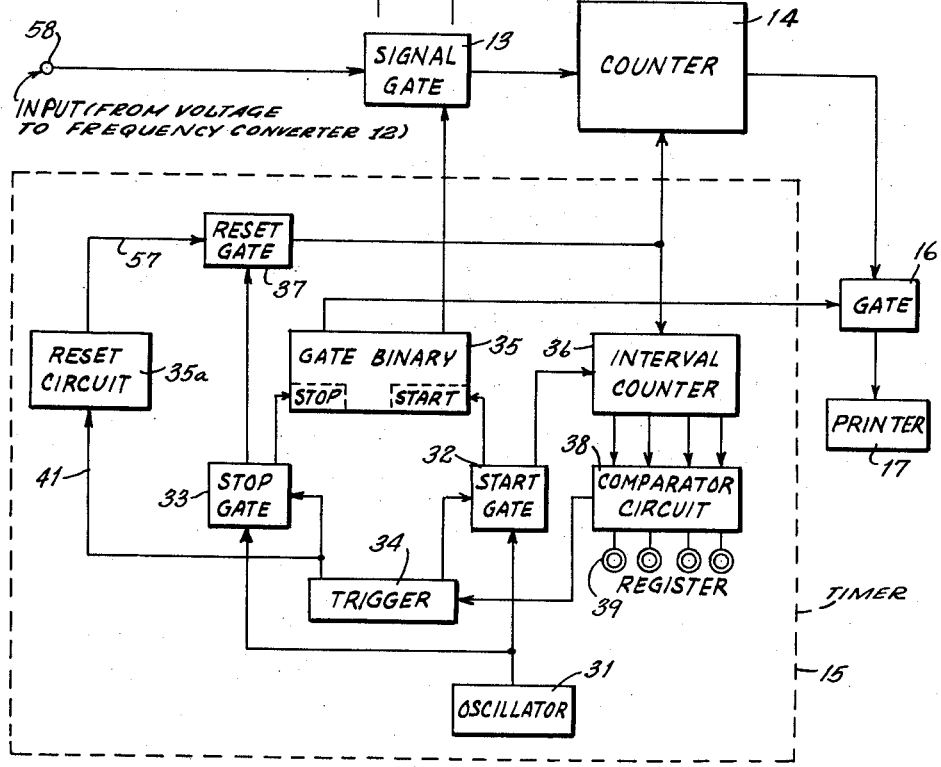
FIG. 3 is a block diagram of the timer shown as a single block in FIG. 1 and the elements controlled thereby.
Figure 4:
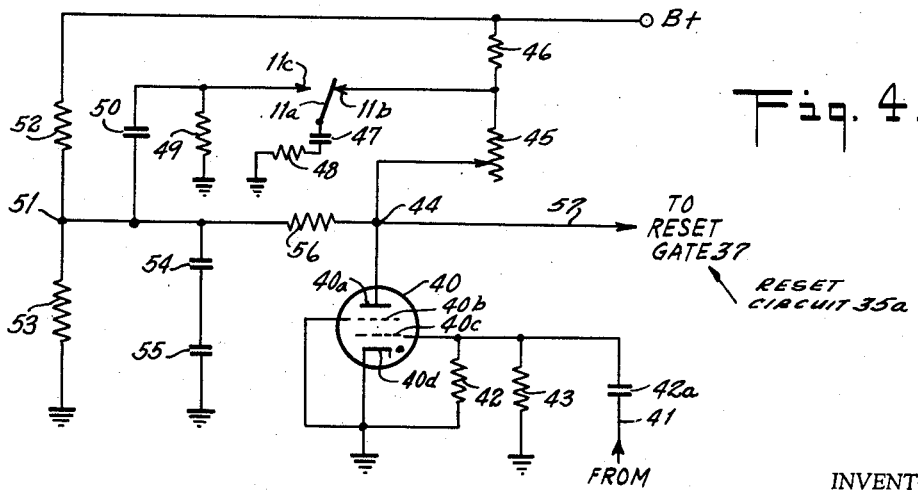
FIG. 4 is a wiring diagram of the reset circuit shown as a single block in FIG. 3.

*Operation of FIGS. 3 and 4*

Assume for the purposes of explanation that the start gate 32 has just been opened by the trigger 34. The next pulse of the train appearing at the input of gate 32 is then passed through the gate to the start input of the gate binary 35. This pulse triggers the binary 35 into its ON condition, in which it holds the signal gate 13 open. The binary 35 remains in this state until it is supplied with a pulse at its stop input, regardless of the further pulses in the train arriving at the start input. With the gate 13 open, the pulses arriving from the voltage to frequency converter 12 through input terminal 58 (corresponding to output terminal 29 of the converter 12) are passed through the signal gate 13 to the counter 14, where the pulses are counted and the total of the pulses may be displayed.

The pulses from the oscillator 31 passing through the start gate are also supplied to the interval counter 36 and the output of that counter 36 is continuously compared by the comparator circuit 38 with the count previously set in the register 39. Since the oscillator 31 operates at a fixed frequency, the register 39 and counter 36 cooperate with comparator 38 as a timer to shift the output of comparator 38 at a time predetermined by the setting of the register 39. When the count in the counter 36 reaches the value set in register 39, the comparator registers coincidence of the two counts and supplies a positive stop voltage to the trigger 34, switching that trigger to its complementary stable condition, in which the start gate 32 is closed and the stop gate 33 is open. When the start gate is closed, pulses are no longer supplied to the inputs of the counter 36. Opening of the stop gate 33 passes a pulse to the stop input of the gate binary 35, thereby closing the signal gate 13 and stopping the operation of the counter 14, which now displays the total input pulses received from the input 58. The gate binary 35 also opens the gate 16, so that the count appearing in the counter 14 is now registered by the printer 17.

When the trigger 34 changes its state and opens the gate 33, it supplies a voltage through wire 41 which is differentiated by capacitor 42a (FIG. 4) and resistances 42 and 43, thereby applying a positive pulse to the control electrode 40c of the thyratron 40, and turning the thyratron ON so that capacitor 47 is discharged through the thyratron. The resistance in series with the plate of the thyratron is sufficiently high to prevent it from remaining in the ON state after the positive pulse to the control electrode 40c disappears. The potential at point 44 swings positive, thereby closing the reset gate 37. The reset gate 37 remains closed until the contact 11a is operated from its position in engagement with contact 11b to its position in engagement with contact 11c. During its engagement with contact 11b, capacitor 47 is charged through resistor 46. When contact 11a moves to engage contact 11c, capacitor 47 is discharged through capacitor 50 and resistor 56, thereby supplying a switching pulse to the reset gate 37, and opening that gate.

When the stop gate 33 is opened by trigger 34, the first pulse passing through it to the stop input of the gate binary 35 switches that binary to close the signal gate 13 and also to open the gate 16 between the counter 14 and the printer 17. The pulses accumulated in the counter 14 are then effective to actuate the printer. The pulses pass through the stop gate 33 to the reset gate 37, but this gate is held closed by the reset circuit 35a until the latter is tripped by actuation of the contact 11a. Actuation of contact 11a into engagement with contact 11c produces an opening pulse at the reset gate so that the next pulse through the stop gate passes through the reset gate and is effective to reset both the counter 14 and the counter 36 to zero. Resetting of the counter 36 to zero switches the comparator circuit 38, which in turn switches the trigger 34, closing the stop gate 33 and opening the start gate 32. The apparatus is now back in the condition assumed at the beginning of the description of the operation.

It may be seen that the pulses from the voltage-to-frequency converter 12 are counted during the interval determined by the setting of the register 39. The length of that interval must be coordinated with the length of the weighing platform, the length of the cars being weighed, and the speed of the cars passing over the platform, to ensure that the integration interval is completed before the first axle of the car passes off the platform.

While I have shown the integration intervals as being initiated by mechanism actuated by a pair of track switches 7 and 8, it will be recognized by those skilled in the art that other types of mechanism may be employed for detecting the fact that a car is completely scale borne. For example, if cars of different wheel base are to be measured in the same train, an axle counting mechanism may be substituted for the wheel operated switches.

*FIG. 5*

This figure shows the variation of the load cell output with time as two continuously moving cars pass over the weighing platform 1. The first axle of car A is considered to move onto the platform at time zero. The load cell output increases continuously for a brief interval thereafter and then oscillates above and below an average value indicated at 59. At the beginning of the interval 64 the integration is started by actuation of switches 7 and 8. The amplitude of the oscillation decreases as the car moves across the platform. As the first axle moves off the platform, the load cell output decreases continuously, as shown at 60. Before the output is decreased to zero, the first axle of car B moves onto the platform, so that the trend reverses at 61, and the load cell output increases continuously as shown at 62 and then oscillates about a value 63, representing the weight of car B. In the apparatus described herein, the output of the load cell is integrated to measure the weight of car A during the interval 64. Similarly, the load cell output is measured to indicate the weight of car B during the interval 65.

The continuous increase just after time zero is illustrated for convenience as being linear, and the decrease 60 and increase 62 are also illustrated as linear. It should be realized that these variations are not necessarily linear. The particular form of variation during these intervals is of no consequence, since these parts of the curve are discarded.

*FIG. 6*

Figure 6:
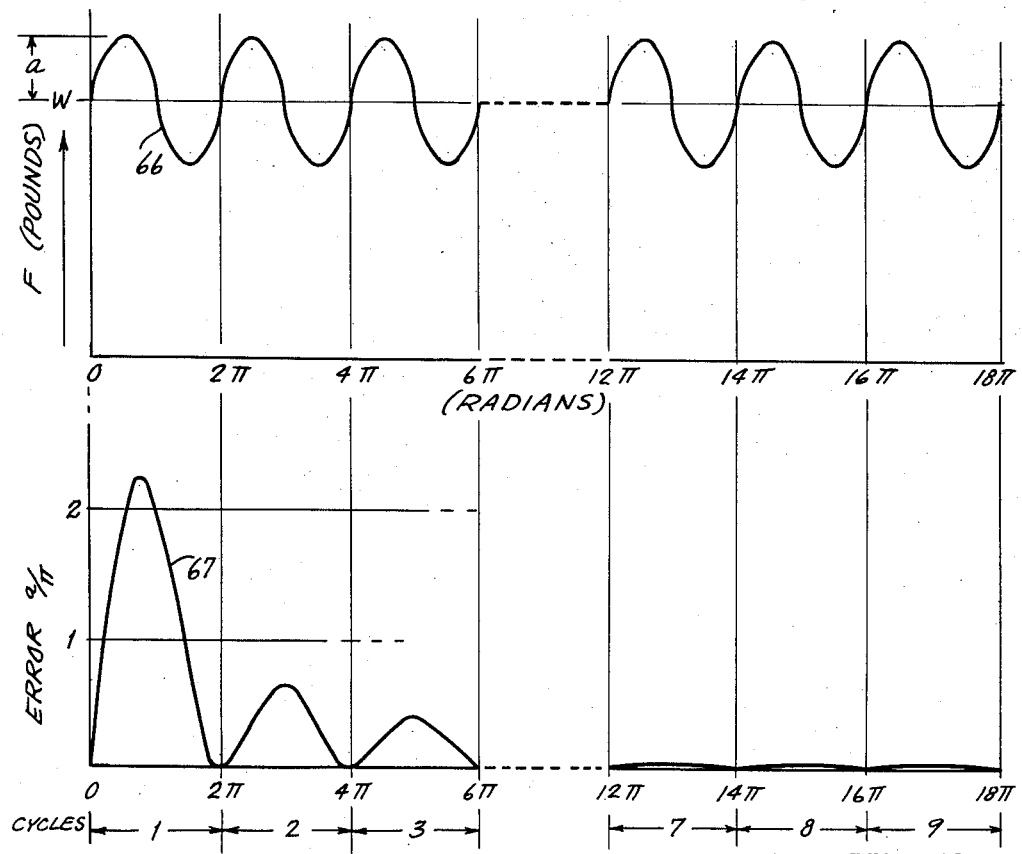
FIG. 6 is a graphical illustration of the variation of error in the weight determination as the number of cycles over which the weight is integrated varies.

This figure illustrates the variation of accumulated error resulting from integration with apparatus of the type described. In FIG. 6, the input signal from the load cell is shown at 66, and is illustrated, by way of example, as a pure sine wave. It should be understood that in any practical weighing problem, the load cell output is not necessarily a pure fundamental frequency sine wave. The wave 66 is illustrated as starting at zero. The integrating interval may start at zero on the load cell output wave or it may start at some other phase of the load cell output cycle depending on the relationships existing at the instant the counter cycle is initiated.

The curve 67 in FIG. 6 illustrates the variation in accumulated error as the integration proceeds over several cycles. It may be seen that while the integration error is large during the first half-cycle, it becomes zero at the end of each complete cycle. Furthermore, the peak error reduces substantially from cycle to cycle.

The pure sine wave 66 is selected to illustrate the inherent nature of the integrating system to absorb oscillatory weight variation with decreasing total error. The mathematical derivation of curve 67 is as follows:

Equation of curve 66 for instantaneous weight at any time ($t$):

$$f(t) = W + a \sin \omega t \quad (1)$$

$$\int_0^t f(t)\, dt = [Wt]_0^t - \frac{[a \cos \omega t]_0^t}{\omega} \quad (2)$$

$$= Wt - \left(\frac{a \cos \omega t}{\omega} - \frac{a}{\omega}\right) \quad (3)$$

$$= Wt + \frac{a}{\omega}(1 - \cos \omega t) \quad (4)$$

The average weight to any time ($t$)

$$= \frac{1}{t} \int_0^t f(t)\, dt \quad (5)$$

$$= W + \frac{a}{\omega t}(1 - \cos \omega t) \quad (6)$$

where W equals static weight and $$\frac{a}{\omega t}(1 - \cos \omega t) \quad (7)$$

equals dynamic error. The decay factor $$\frac{a}{\omega t}$$

of the error component becomes smaller with time. Considering odd multiples of $\pi$ only, the decay factor decreases in value as follows:

| Time ($t$), $\pi$ radians | Error Decay, $a/\pi$ units | Percent decrease |
| --- | --- | --- |
| 1 | 2 | |
| 3 | 2/3 | 66.7 |
| 5 | 2/5 | 80 |
| 7 | 2/7 | 85.7 |
| 9 | 2/9 | 88.9 |

In the case of more complex waves, involving harmonics of the fundamental frequency, it will readily be understood that the error component decays more rapidly with increasing frequency. Since the more complex waves are the ones actually encountered in practice, it may be seen that the pure sine wave selected above for purposes of illustration overstates the system error as compared with the error encountered in actual practice.

Figure 5:
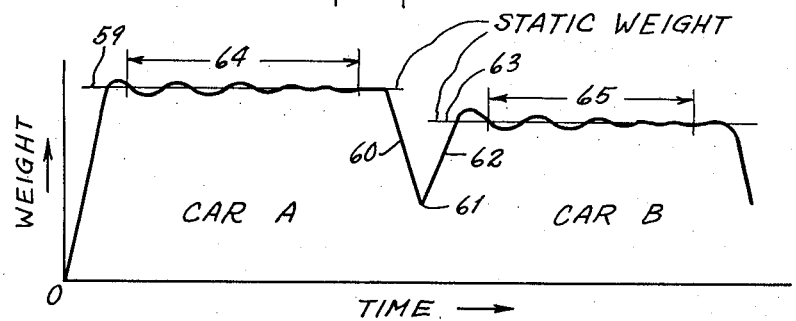
FIG. 5 is a graphical representation of the variation of the load cell weight signal with time for two cars coupled together as they pass over the weighing platform.

Consequently, if the integrating interval represented by the time 64 or 65 in FIG. 5 is taken long enough to include, for example, nine cycles of the load cell output wave, then nearly all the errors due to changes in phase with respect to the instant of starting and ending the integration interval may be effectively eliminated.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. In apparatus for weighing each of a plurality of massive moving objects, the combination of:
   (a) a weighing platform whose vertical position varies with the downward force of the platform and an object supported thereby and which is located so that each of the objects in turn passes over and is supported by the platform;
   (b) means for generating a signal representative of the vertical position of the platform; and
   (c) means responsive to the positioning of each of the objects on the platform for continuously integrating said signal for a time that includes a plurality of cycles of said signal while each object is on the platform.

2. Weighing apparatus as defined in claim 1, wherein said signal generally means comprises:
   load cell means responsive to said platform vertical position to generate an electrical potential varying with said position, and
   said integrating means comprises electrical means for integrating said potential.

3. Weighing apparatus as defined in claim 2, in which the integrating means comprises:
   (a) potential-to-frequency converter means having an input connected to said load cell means and an output, and effective to produce at its output a signal whose frequency varies as a function of the potential at its input; and
   (b) means for counting the cycles of said output signal.

4. Apparatus for weighing a massive moving object, comprising:
   (a) a yieldably mounted platform for supporting said object throughout a horizontal portion of its path of movement; said platform being subject to an oscillating movement during passage of an object along said path;
   (b) means for generating a signal representative of the platform position;
   (c) means for continuously integrating said signal as the object travels over at least a predetermined part of said horizontal portion of its path; and
   (d) means responsive to said integrating means to exhibit the weight of said object.

5. Apparatus for weighing a massive elongated object moving in the direction of its elongation, comprising:
   (a) a yieldably mounted platform for supporting said object throughout a horizontal portion of its path of movement; said platform being subject to an oscillating movement during passage of an object along said portion of the path;
   (b) means for generating a signal representative of the platform position;
   (c) means for continuously integrating said signal;
   (d) means for initiating operation of the integrating means after a trailing part of the object passes onto the platform;
   (e) means for terminating operation of the integrating means before a leading part of the object passes off the platform; and
   (f) means responsive to said integrating means to exhibit the weight of the object.

6. Apparatus for weighing a massive moving object, comprising:
   (a) a platform for supporting said object throughout a horizontal portion of its path of movement;
   (b) load cell means coupled to the platform for generating an electrical potential varying as a function of the downward force exerted by the platform and the object;
   (c) electrical means for continuously integrating said potential as the object travels over at least a predetermined part of said horizontal portion; and
   (d) means responsive to said integrating means to exhibit the weight of said object.

7. Apparatus for weighing a massive moving object, comprising:
   (a) a platform for supporting said object throughout a horizontal portion of its path of movement;
   (b) load cell means coupled to the platform for generating a potential varying as a function of the downward force exerted by the platform and the object;
   (c) potential-to-frequency converter means having an input connected to said load cell means and an output, and effective to produce at its output a signal whose frequency varies as a function of the potential at its input;
   (d) means for counting the cycles of said output signal as the object travels over at least a predetermined part of said horizontal portion; and
   (e) means for exhibiting the count determined by said counting means.

8. The method of weighing a massive moving object, comprising:
   (a) moving the object along a yieldably supported weighing platform and concomitantly subjecting the platform to a motion varying cyclically;
   (b) generating a signal representative of the position of the platform; and
   (c) continuously integrating said signal for a time that includes a plurality of cycles of said signal.

9. The method of weighing a massive moving object, comprising:
   (a) moving the object along a weighing platform and concomitantly subjecting the platform to stress varying cyclically;
   (b) generating an electrical potential varying as a function of the stress;
   (c) continuously integrating said potential over a plurality of its cyclical variations; and
   (d) exhibiting the integral of said potential as a measure of the weight of the object.

10. In a method of weighing each of a plurality of massive moving objects, the steps comprising:
    (a) moving the objects so that they in turn pass over and are supported by a weighing platform whose vertical position varies with the downward force of the platform and an object supported thereby,
    (b) generating a signal representative of the vertical position of the platform; and
    (c) continuously integrating said signal for a time that includes a plurality of cycles of said signal while each object is on the platform.

11. In apparatus for weighing a massive moving object, the combination comprising:
    (a) a yieldably mounted platform for supporting said object through at least a portion of its movement, said platform being subject to an oscillating movement during passage of an object thereover;
    (b) means for generating a signal representative of the platform position; and
    (c) means for continuously integrating said signal for a time that includes a plurality of cycles of said signal.

References Cited by the Examiner
UNITED STATES PATENTS

| | | | |
|---|---|---|---|
| 2,627,372 | 2/53 | Razek | 235—183 |
| 2,746,739 | 5/56 | Philippovic | 177—16 |
| 2,764,399 | 9/56 | Porter | 177—211 X |
| 3,048,336 | 8/62 | Ritzenthaler | 235—183 |
| 3,063,635 | 11/62 | Gordon | 235—151 |
| 3,067,939 | 12/62 | Ziffer | 235—183 |
| 3,104,318 | 9/63 | Hill | 235—183 |
| 3,108,648 | 10/63 | Williams | 177—3 |

LEYLAND M. MARTIN, *Primary Examiner.*

LEO SMILOW, *Examiner.*